(12) United States Patent
Lee

(10) Patent No.: US 8,851,691 B2
(45) Date of Patent: Oct. 7, 2014

(54) KEYBOARD

(71) Applicant: Hyung Tae Lee, Seoul (KR)

(72) Inventor: Hyung Tae Lee, Seoul (KR)

(73) Assignees: Wenyu Zhang, Beijing (CN); Leetis Technology Development (HK) Company Limited., Kowloon (HK)

( * ) Notice: Subject to any disclaimer, the term of this patent is extended or adjusted under 35 U.S.C. 154(b) by 167 days.

(21) Appl. No.: 13/726,734

(22) Filed: Dec. 26, 2012

(65) Prior Publication Data

US 2013/0208440 A1    Aug. 15, 2013

(30) Foreign Application Priority Data

Feb. 15, 2012  (KR) ........................ 10-2012-0015233

(51) Int. Cl.
*G01D 11/28*    (2006.01)
*F21V 33/00*    (2006.01)
*G06F 1/16*     (2006.01)

(52) U.S. Cl.
CPC .. *F21V 33/00* (2013.01); *G06F 1/16* (2013.01)
USPC .................................... 362/23.03; 362/23.07

(58) Field of Classification Search
CPC ....... F21V 33/00; G06F 1/16; H01H 13/7006; H01H 13/705; H01H 9/182; H01H 2219/036
USPC ......... 362/23.03–23.05, 23.07–23.1; 200/5 A
See application file for complete search history.

(56) References Cited

U.S. PATENT DOCUMENTS 6,554,442 B2 *   4/2003   Chou ............................. 362/85

* cited by examiner

*Primary Examiner* — Jason Moon Han
(74) *Attorney, Agent, or Firm* — Anova Law Group, PLLC (57) ABSTRACT

A keyboard includes a keyboard shell; a supporting panel; a plurality of keycaps; a plurality of keycap supports between the supporting panel and the corresponding keycaps; a plurality of elastomers through the corresponding elastomer holes; an FPC sheet with a plurality of key signal pads corresponding to the plurality of elastomers; a light emitting substrate arranged under the FPC sheet, and a plurality of light emitting light emitting parts arranged on the light emitting substrate; a fixing groove which is used for fixing the supporting panel, the FPC sheet and the light emitting substrate formed on the keyboard shell; the elastomer being arranged on the FPC sheet; the supporting panel, the FPC sheet, and the light emitting substrate being supported in the keyboard shell and the light beams from the light emitting part being guided through the light through holes to the up side of the supporting panel.

10 Claims, 10 Drawing Sheets

KEYBOARD

FIELD OF THE INVENTION

The present disclosure relates to the art of keyboards and particularly to a keyboard having backlight which illuminates light from the bottom of the keycap.

DESCRIPTION OF RELATED ART

Keyboards usually are used to input signals to computers by tapping key bodies. Herein in this invention keyboard is an input device used for computer, portable computer and other devices having signals inputting.

Recently, a keyboard that can be used in dim with accurate operations and having light beams irradiated from undersides of the keycaps to the keycaps has been disclosed.

Figure 9:
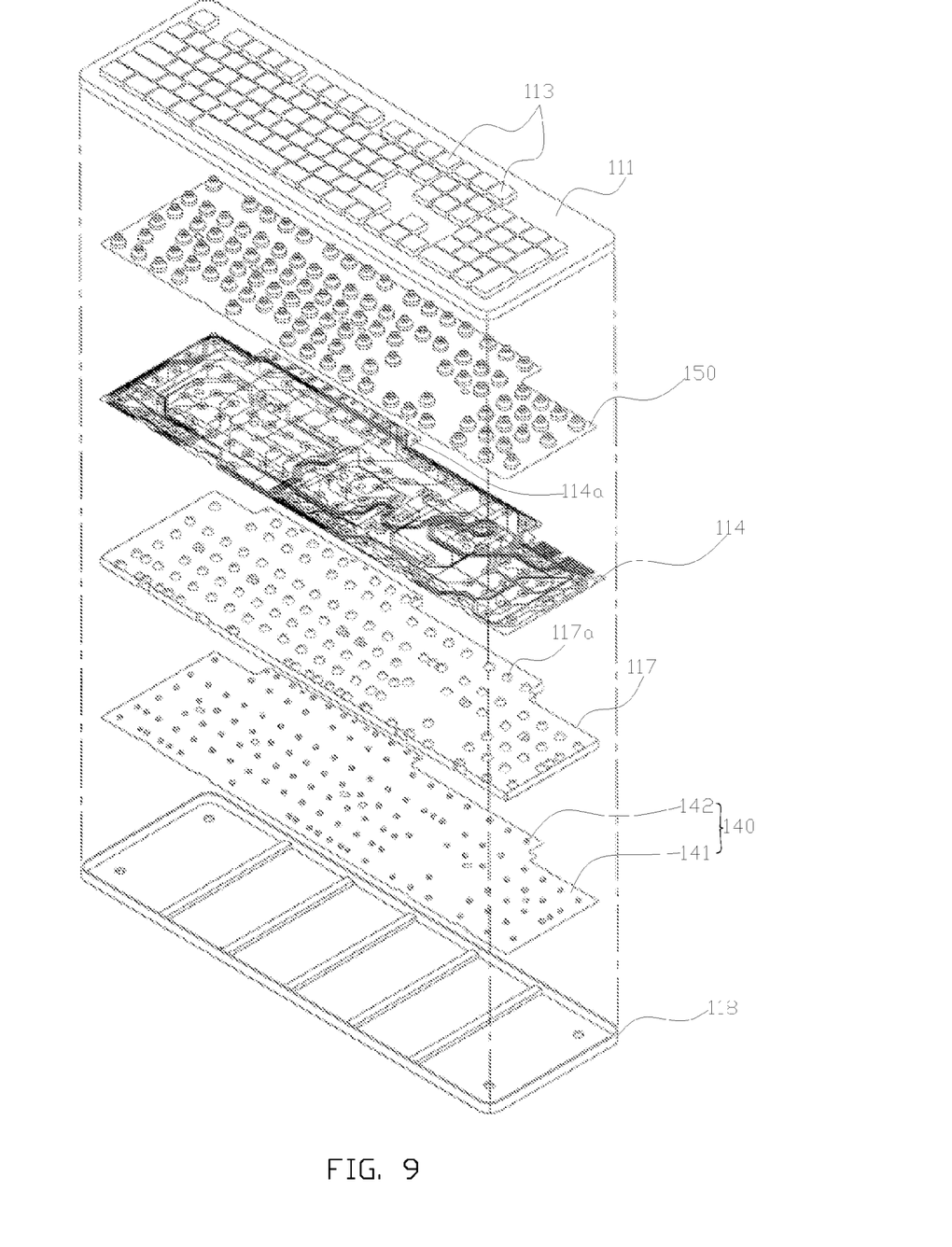
FIG. 9 is an exploded view of a conventional keyboard.
Figure 10:
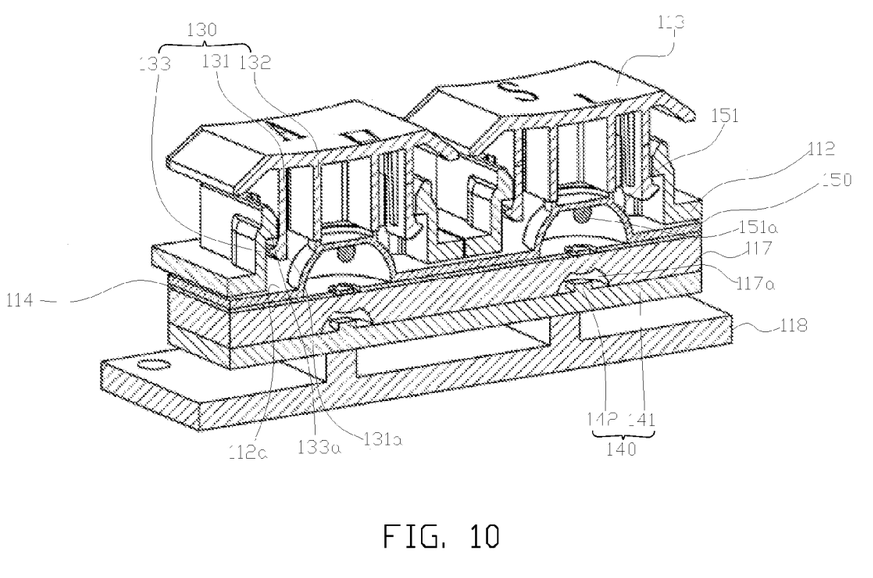
FIG. 10 is a cross-sectional view of part of the conventional keyboard.

FIG. 9 is an exploded view of a backlight keyboard in accordance with an exemplary embodiment of a conventional keyboard. FIG. 10 is an cross-sectional view of a main part of the conventional keyboard of FIG. 9. The conventional keyboard as shown in FIGS. 9~10 includes a keyboard shell 111, a supporting panel 112 integrated with the keyboard shell 111 and having a plurality of elastomer holes 112a therein, a plurality of keycaps 113 arranged on the elastomer holes 112a, a plurality of keycap supports 130 against the supporting panel 112 for supporting the keycaps 113, an elastomer panel 150 arranged under the supporting panel 112, a flexible printed circuit (FPC) sheet 114 arranged under the elastomer panel 150, a light defusing panel 117 under the FPC sheet 114, a light emitting part 140 with a light emitting substrate 114 arranged under the light defusing panel 117, a main board (not shown) electrically connecting the FPC sheet 114 and the light emitting part 140, and a rear panel 118 arranged under the light emitting substrate 114.

The keyboard shell 111 with the above described structure can be made of material of metal or metal alloy, such as aluminum, or can be made of material of hard synthetic resin.

The supporting panel 112 is exposed at the upper side of the keyboard shell 111, and integrated with the keyboard shell 111.

The keycap support 130 is constituted with an up-down guide portion 131 formed in an underside of the keycap 113, a pressure portion 132 formed inside of the up-down guide portion 131 and a guide rail 133 formed around the elastomer hole 112a which formed on the supporting panel 112.

The up-down guide portion 131 has a protrusion 131a in a bottom end thereof. The pressure portion 132 has its bottom end contacting with a top end of an elastomer 151. The guide rail 133 has a limit corner 133a in its upper part.

The protrusion 131a and the limit corner 133a can be buckled with each other.

The keycap support 130 has such a configuration that the keycap 113 is closed to the supporting panel 112 when pressed down.

The elastomer panel 150 has elastomers 151 corresponding to the elastomer holes 112a. The elastomer 151 is arch shaped overall, and a pressure protrusion 151a is formed inside.

The elastomer 151 can be made of rubber or other elastic and transparent materials.

The FPC sheet 114 includes a middle insulative layer, an upper layer and a lower layer arranged at the both sides of the insulative layer respectively, and outer connecting pads 114a electrically connecting the upper layer and the lower layer.

The connecting holes corresponding to the elastomer holes 112a are arranged in the insulative layer.

The upper key signal pads and the corresponding lower key signal pads are formed on the corresponding upper layer and lower layer.

The outer connecting pads 114a are electrically connected to the upper key signal pads, the lower key signal pads, and the main board (not shown).

With the above described structure, when the elastomer 151 is pressed by the keycap 113, as described later, the pressure protrusion 151a provides pressure to the upper key signal pad, then the upper key signal pad passes through the corresponding connecting hole and connects the lower key signal pad.

When the upper key signal pad is connected to the lower key signal pad, the key signal is in ON state.

When the pressure is released from the keycap 113, the upper key signal pad is separated from the lower key signal pad, then the key signal is in OFF state.

The ON state and the OFF state signal are transmitted to a main body of a computer through the outer connecting pads 114a and the main board (not shown).

The FPC sheet 114 with the above described structure is similar to that of the conventional technology.

An arch-shaped lens 117a formed on the light defusing panel 117 is arranged under the elastomer 151. The light emitting part 140 includes a light emitting substrate 141 and some light emitting members 142 arranged on the light emitting substrate 141.

The light emitting substrate 141 is preferably selected from metal PCB, ceramic PCB and such high-temperature substrates.

The light emitting substrate 141 is electrically connected to the main board (not shown).

Light emitting driver chips are arranged on the light emitting substrate 141. The light emitting driver chips receive light emitting control signals from the computer via the main board (not shown), and drive the light emitting members 142 to emit light beams.

The light emitting members 142 can be light emitting diodes (LEDs).

The light emitting members 142 with the above described structure is arranged on the light emitting substrate 141, and are under the arch-shaped lens 117a.

Light beams emitted from the light emitting members 142 cross the arch-shaped lens 117a and the elastomer 151, and reach the upper side of the supporting panel 112.

The driving voltage of the light emitting member 142 is from a battery disposed on the keyboard shell 111 or from the main body of a computer.

The main board (not shown) is electrically connected to the computer via electric codes The rear panel 118 is caved and connected to the keyboard shell 111 with some screws.

In the following, the assembling method of the above-described keyboard will be disclosed.

Firstly, the keycaps 113 are installed. The keycap support 130 is supported on the supporting panel 112.

Finally, when the elastomer panel 150, the FPC sheet 114, the light defusing panel 117, and the light emitting substrate 114 are installed between the keyboard shell 111 and the real panel 118, the real panel 118 is fastened to the keyboard shell 111 by screws.

The above described keyboard is disclosed in Korean patent with patent application number 54613 (named as illuminating keyboard).

However, the elastomer 151 are formed on the elastomer panel 150. In order to receive the FPC sheet 114 and the light emitting substrate 141, the rear panel 118 must be concave. This increases the total thickness of the keyboard and is not convenient for the user.

Therefore, it is desirable to provide a keyboard which can overcome the above-mentioned problem.

SUMMARY

This invention discloses a keyboard with decreased thickness.

A keyboard includes a keyboard shell; a supporting panel arranged to the keyboard shell and having a plurality of elastomer holes therein; a plurality of keycaps arranged on the corresponding elastomer holes; a plurality of keycap supports between the supporting panel and the corresponding keycaps; a plurality of elastomers through the corresponding elastomer holes and being exposed out of the supporting panel; an FPC sheet under the supporting panel with a plurality of key signal pads corresponding to the plurality of elastomers, when pressure is provided on the keycap and corresponding elastomer, the corresponding key signal pads are in ON state, and when pressure is released from the keycap and corresponding elastomer, the key signal pads are in OFF state; a light emitting substrate arranged under the FPC sheet, and a plurality of light emitting part with light emitting member arranged on the light emitting substrate; a fixing groove which is used for fixing the supporting panel, the FPC sheet and the light emitting substrate to the keyboard shell, the fixing grooves extending from the bottom of the keyboard shell to the supporting panel; the elastomer being arranged on the FPC sheet; the supporting panel, the FPC sheet, and the light emitting substrate being fixed to the keyboard shell through the fixing groove; light through holes formed around the elastomer on the FPC sheet, the light emitting members being arranged on the light emitting substrate, and the light beams from the light emitting members are via the light through holes to the up side of the supporting panel.

Furthermore, the fixing groove comprises a fixing frame which reaches the top of the supporting panel; the supporting panel, the FPC sheet, and the light emitting substrate are supported in the keyboard shell; the elastomer being arranged on the FPC sheet; the supporting panel, the FPC sheet, and the light emitting substrate being supported in the keyboard shell through the fixing groove; light through holes formed around the elastomer on the FPC sheet, the light emitting members being arranged on the light emitting substrate, and the light beams from the light emitting members are via the light through holes to the up side of the supporting panel.

Furthermore, the elastomers are arranged on the FPC sheet. The fixing groove has fixing frame which reaches the upper side of the supporting panel. The supporting panel, the FPC sheet, and the light emitting substrate are assembled in the keyboard shell. This structure keeps the supporting panel, the FPC sheet, and the light emitting substrate stable in the keyboard shell, and does not increase the thickness of the keyboard.

Furthermore, the keyboard further comprises a supporting platform, the supporting platform reaches the upper side of the supporting panel without interfering the elastomer and the keycap support, and extends from the keyboard shell; the supporting panel, the FPC sheet, and the light emitting substrate are supported in the keyboard shell by the supporting platform, and does not increase the thickness of the keyboard.

Furthermore, the area of the elastomer hole being greater than that of the elastomer, and the space between the elastomer hole and the elastomer defining a light through hole.

The elastomers are arranged on the FPC sheet. The fixing groove has fixing frame which reaches the upper side of the supporting panel. The supporting panel, the FPC sheet, and the light emitting substrate are assembled in the keyboard shell. This structure keeps the supporting panel, the FPC sheet, and the light emitting substrate stable in the keyboard shell, and does not increase the thickness of the keyboard.

DETAILED DESCRIPTION

Reference will now be made to describe an exemplary embodiment of the present disclosure in detail.

Figure 1:
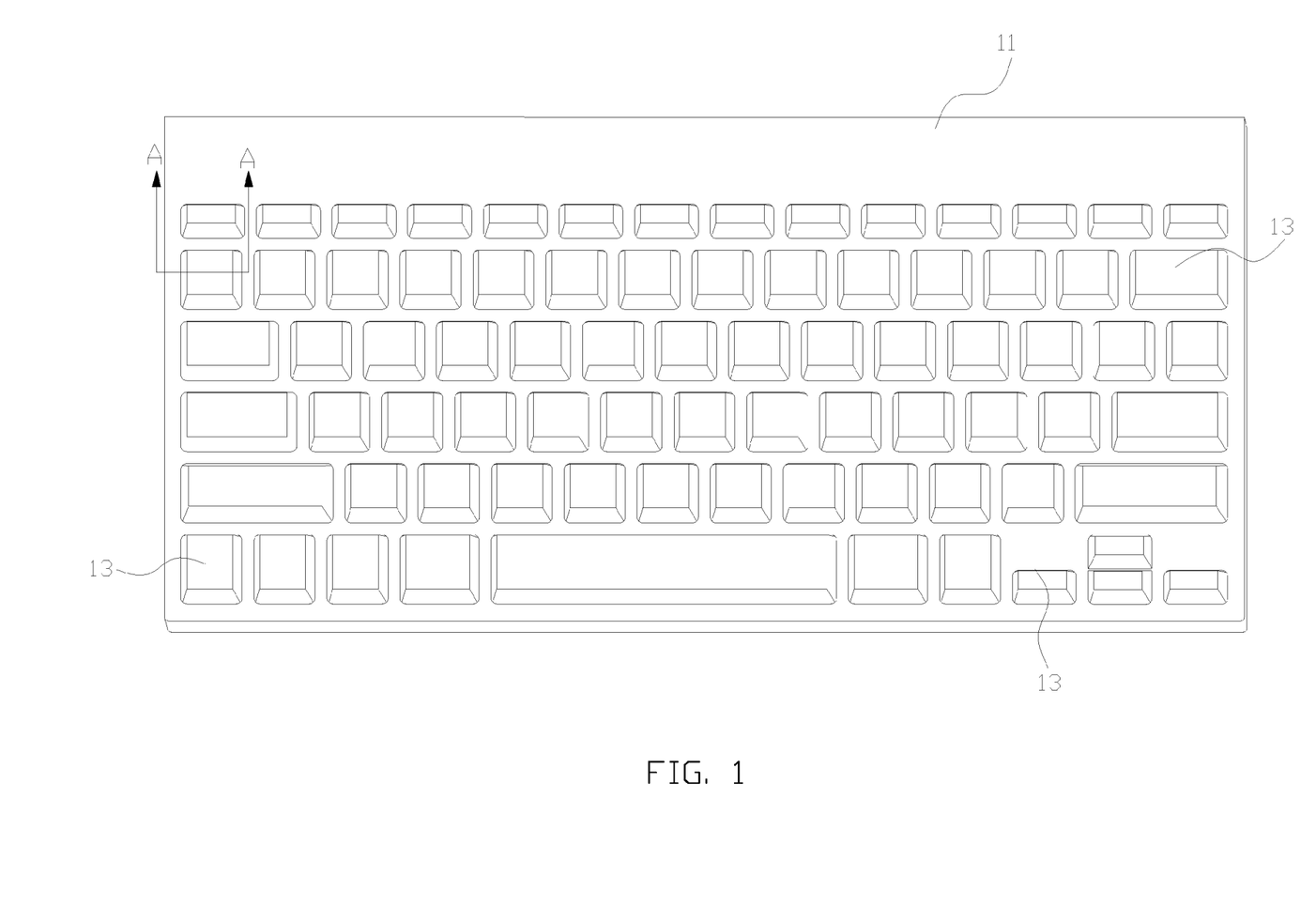
FIG. 1 is an illustrative view of a keyboard in accordance with an exemplary embodiment of the present invention.
Figure 2:
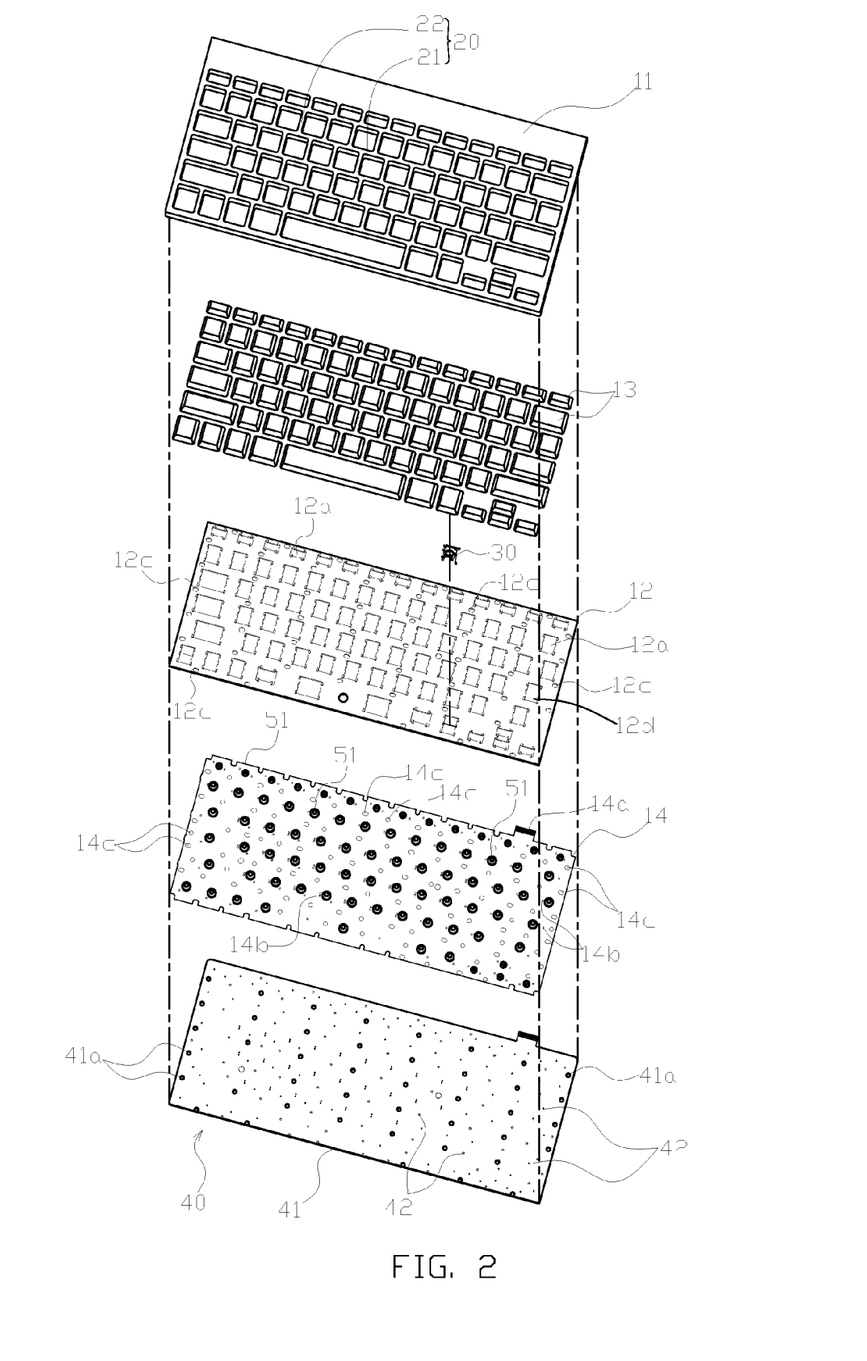
FIG. 2 is an exploded view of the keyboard in accordance with an exemplary embodiment of the present invention.
Figure 3:
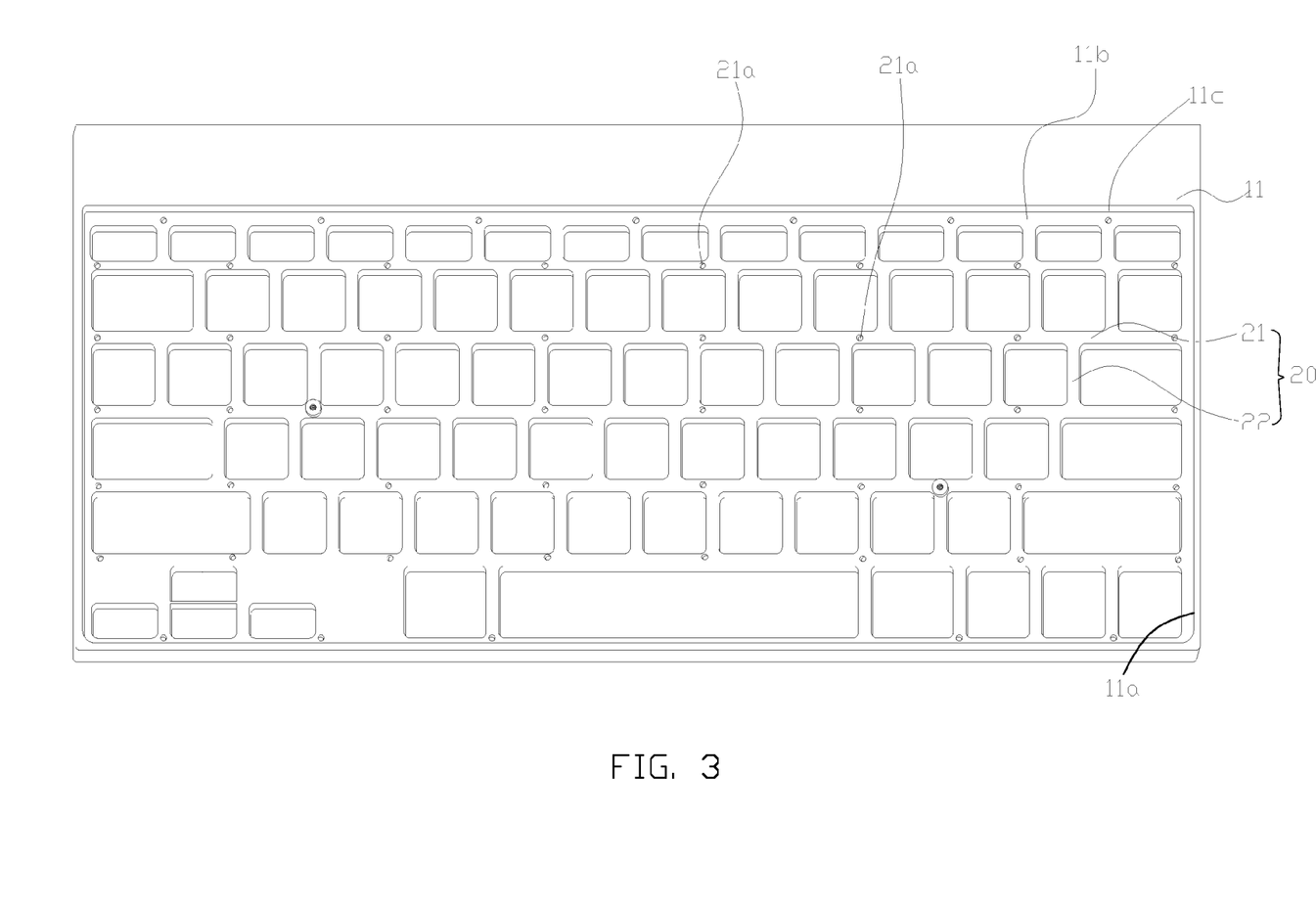
FIG. 3 is an illustrative back view of a keyboard shell of the keyboard of FIG. 2.
Figure 4:
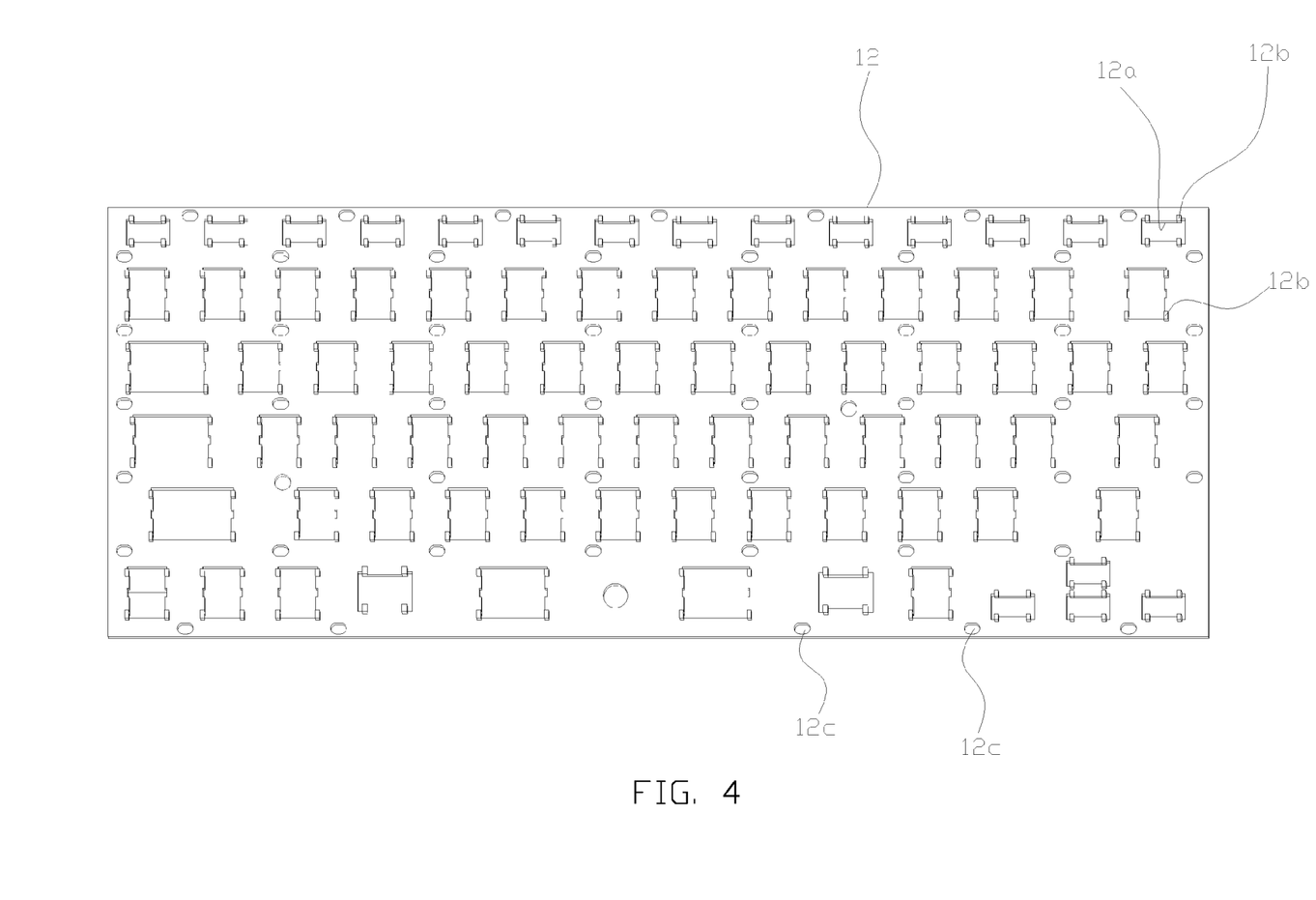
FIG. 4 is an illustrative view of a supporting panel of the keyboard of FIG. 2.
Figure 5:
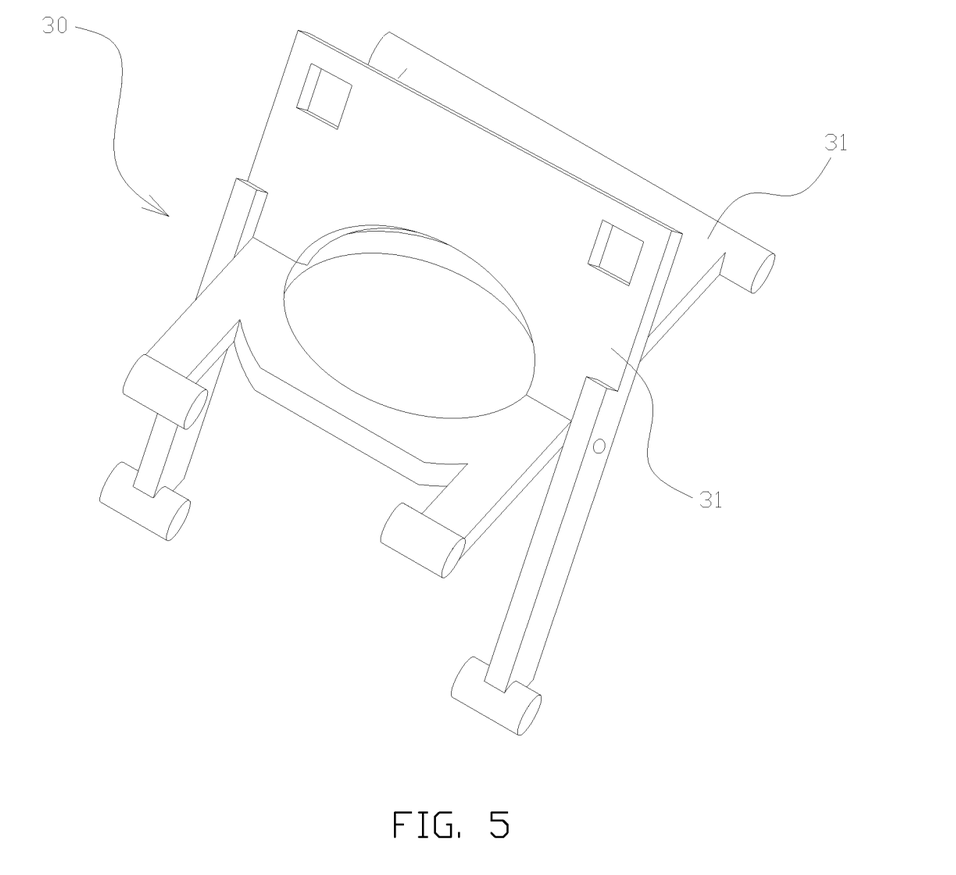
FIG. 5 is an illustrative view of a keycap support of the keyboard of FIG. 2.
Figure 6:
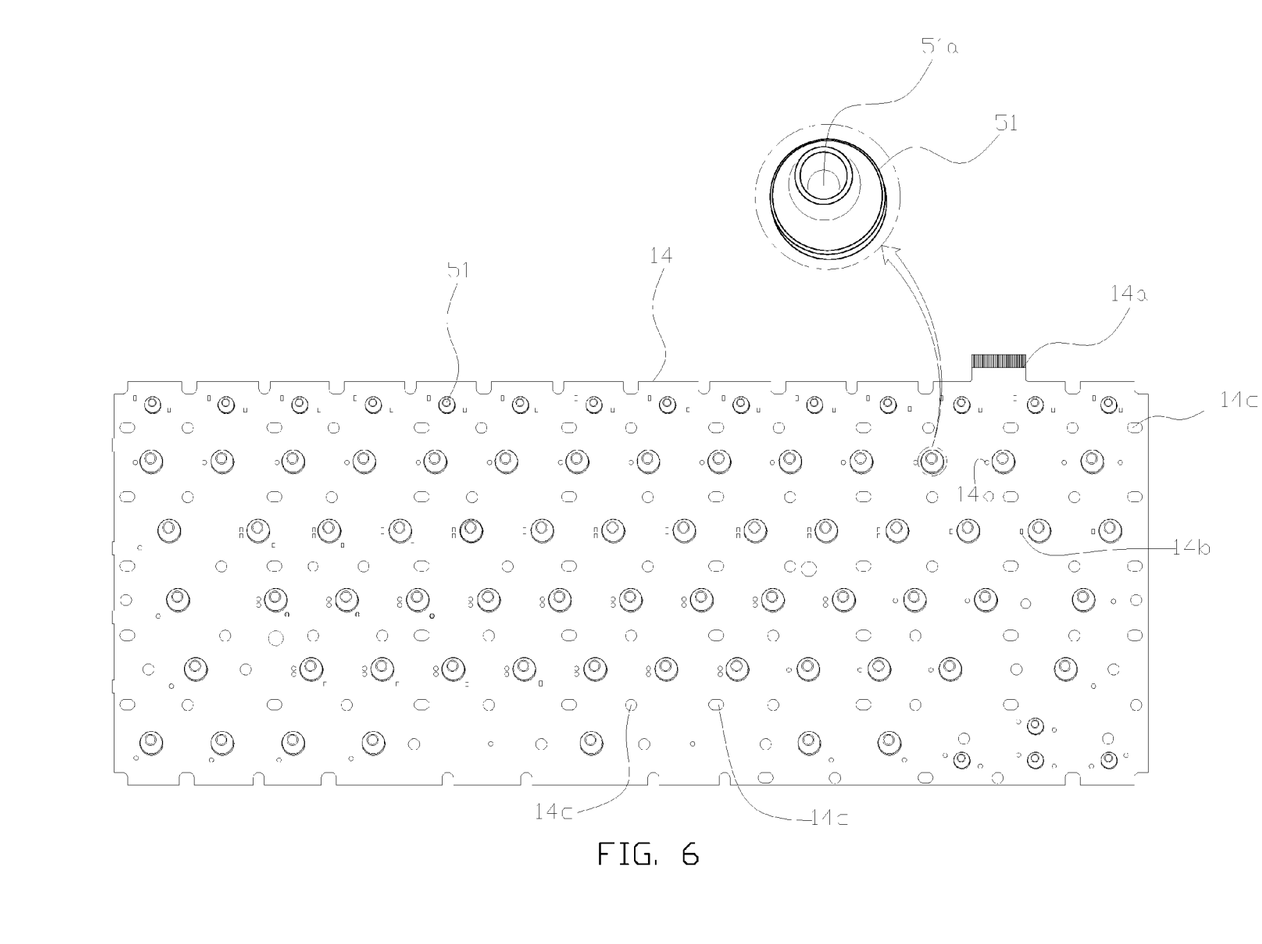
FIG. 6 is an illustrative view of an FPC sheet of the keyboard of FIG. 2.
Figure 7:
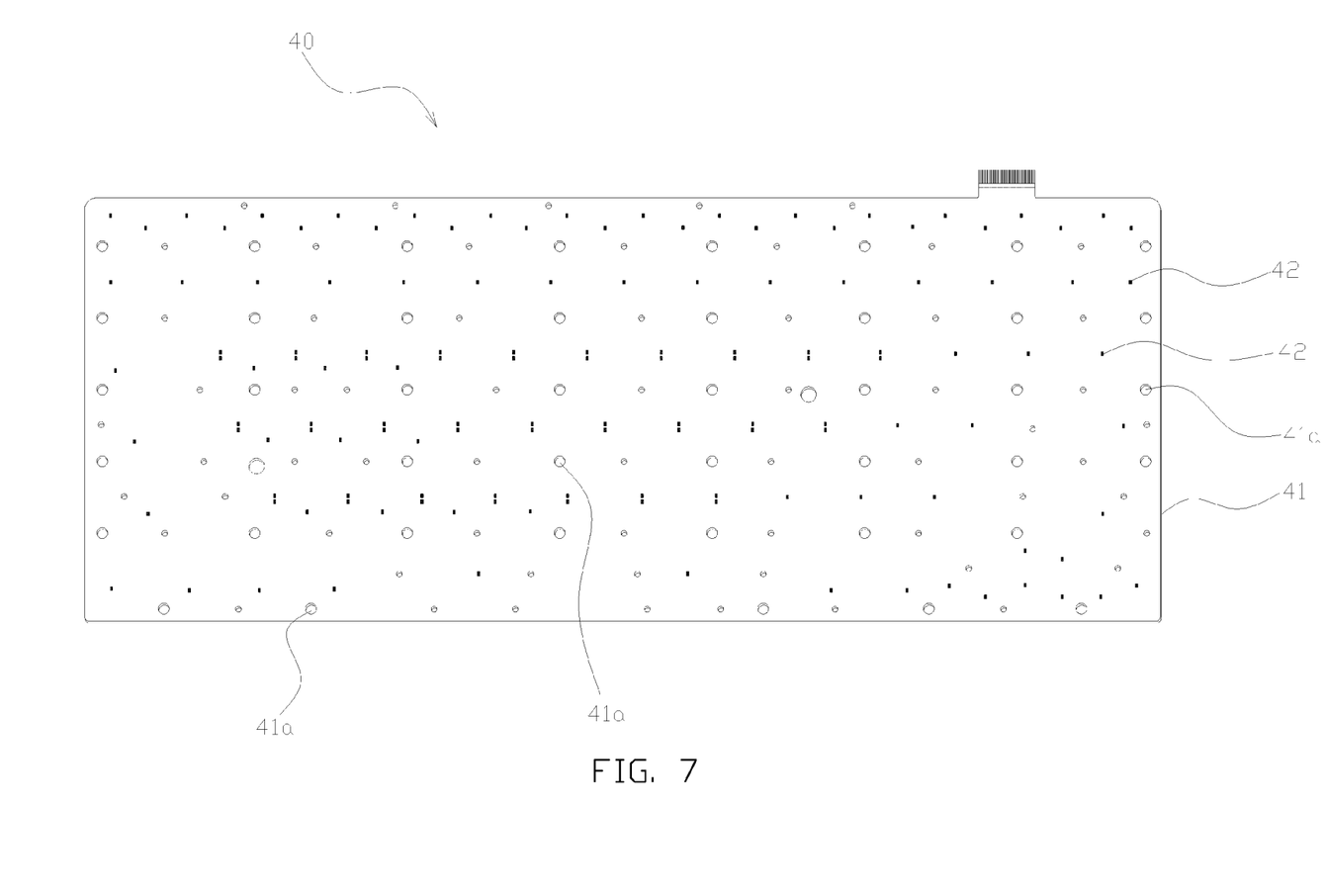
FIG. 7 is an plan view of a light emitting substrate of the keyboard of FIG. 2.
Figure 8:
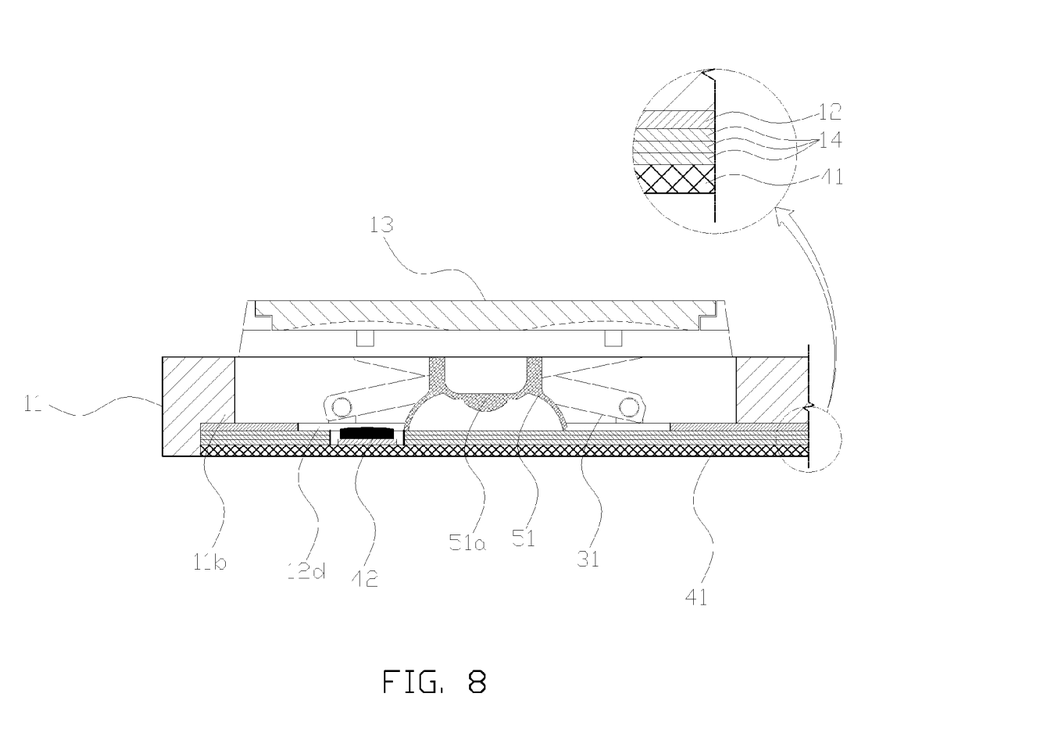
FIG. 8 is an enlarged cross-sectional view of the keyboard along line A-A in FIG. 1.

FIG. 1 is an illustrative view of a keyboard in accordance with an exemplary embodiment of the present invention; FIG. 2 is an exploded view of the keyboard in accordance with an exemplary embodiment of the present invention; FIG. 3 is an illustrative back view of a keyboard shell of the keyboard of FIG. 2; FIG. 4 is an plan view of a supporting panel of the keyboard of FIG. 2; FIG. 5 is an illustrative view of a keycap support of the keyboard of FIG. 2; FIG. 6 is an illustrative view of an FPC sheet of the keyboard of FIG. 2; FIG. 7 is an plan view of a light emitting substrate of the keyboard of FIG. 2; FIG. 8 is an enlarged cross-sectional view of the keyboard along line A-A in FIG. 1.

The keyboard of the present invention as illustrated in the figures includes a keyboard shell 11, a supporting platform 20 formed on the keyboard shell 11, a supporting panel 12 arranged to the keyboard shell 11 with a plurality of elastomer holes 12a, a plurality of keycaps 13 arranged on the elastomer holes 12a, a plurality of keycap supports 30 against the supporting panel 12 for supporting the keycap 13, a flexible printed circuit (FPC) sheet 14 arranged under the supporting panel 12, a plurality of elastomers 51 arranged on the FPC sheet 14, a light emitting substrate 41 with a light emitting part 40 under the FPC sheet 14, a main board (not shown) electrically connecting the FPC sheet 14 and the light emitting part 40.

A fixing groove 11a which is used for fixing the supporting panel 12, the FPC sheet 14, and the light emitting substrate 41 is formed on the keyboard shell 11. The fixing groove 11a extends from the bottom of the keyboard shell 11 to the supporting panel 12.

The fixing groove 11a includes a fixing frame 11b which contacts with the supporting panel 12.

The fixing frame 11b has a plurality of screw holes 11c formed therein.

The keyboard shell 11 with the above described structure can be made of material of metal or metal alloy, such as aluminum, or can be made of material of hard synthetic resin.

The supporting platform 20 includes a plurality of horizontal parts 21 and a plurality of vertical parts 22 connected with each other, thereby forming a plurality of grids arranged in matrix.

The horizontal parts 21 have screw holes 21a formed on its bottom.

The grids formed by the horizontal parts 21 and the vertical parts 22 do not interfere the elastomers 51 and the keycap supports 30.

The supporting platform 20 reaches the top of the of the supporting panel 12. A cross-sectional area of the elastomer holes 12a is greater than that of the elastomers 51. The space between the elastomer holes 12a and the elastomer 51 define a plurality of light through holes 12d.

The supporting panel 12 includes a plurality of screw holes 12c therein. Four supporting protrusions 12b are formed around each elastomer hole 12a. The keycap support 30 has a cross structure. The top of the keycap support 30 is jointed to the keycap 13, and the bottom of the keycap support 30 is jointed to the connecting parts 31 of the four supporting protrusions 12b. The keycap support 30 has a scissors-like structure.

The keycap support 30 can be any of the conventional key cap support, and the detailed structure of the keycap support 30 is omitted.

With the above described structure, when the keycap 13 is pushed down, the keycap 13 is close to the top of the supporting panel 12.

Besides of the scissors-like structure, the keycap support 30 can also be any other exited structure, such as the mechanic keycap support with a up-down guiding slide.

The FPC sheet 14 includes a middle insulative layer, an upper layer and a lower layer arranged at the two sides of the insulative layer respectively, and outer connecting pads 14a electrically connecting the upper layer and the lower layer.

Connecting holes corresponding to the elastomer holes 12a are arranged in the insulative layer.

Upper key signal pads and corresponding lower key signal pads are formed on the corresponding upper layer and lower layer respectively.

The outer connecting pads 14a are electrically connected to the upper key signal pads, lower key signal pads, and the main board (not shown).

With the above described structure, when the elastomer 51 is pressed by the keycap 13, as described later, a pressure protrusion 51a provides pressure to the upper key signal pad, then the upper key signal pad passes through the corresponding connecting hole and electrically connects the lower key signal pad.

When the upper key signal pad is connected to the lower key signal pad, the key signal is in ON state. When the pressure is released from the keycap 13, the upper key signal pad is separated from the lower key signal pad, and then the key signal is in OFF state.

The ON state and OFF state signal are transmitted to the main body of a computer through the outer connecting pads 14a and the main board (not shown).

The FPC sheet 14 with the above described structure is similar to that of the conventional technology, and the detailed structure of the FPC sheet 14 is omitted.

Light through holes 14b around the elastomers 51 are formed on the FPC sheet 14. And a plurality of separated screw holes 14c are also formed on the FPC sheet 14.

The elastomer 51 is similar to the conventional elastomer. The top of the elastomer 51 extends to arched-shaped the bottom of the keycaps 13, and the pressure protrusion 51a is formed in the elastomer 51.

The elastomer 51 can be made of rubber or other elastic or transparent materials. In this invention, the semitransparent material is also included.

The elastomer 51 with the above described structure is adhered on the surface of the FPC sheet 14 via adhesive material.

The elastomer 51 adhered on the FPC sheet 14 crosses the elastomer hole 12a and is exposed out of the supporting panel 12.

The Light emitting part 40 includes a light emitting substrate 41 and a plurality of light emitting members 42 arranged on the light emitting substrate 41.

The light emitting substrate 41 is preferably selected from metal PCB, ceramic PCB and such high-temperature substrates.

The light emitting substrate 41 has a plurality of separated screw holes 41a formed thereon and is electrically connected to the main board (not shown). Light emitting driver chips are arranged on the light emitting substrate 41. The light emitting driver chips receive light emitting control signals from the computer via the main board, and drive the light emitting members 42 to emit light beams. The light emitting members 42 can be light emitting diodes (LEDs).

The light emitting member 42 is arranged on the light emitting substrate, and crosses the corresponding light through hole 14b, and exposes at the upper side of the FPC sheet 14. The light emitted by the light emitting members 42 is via the light through holes 14b and emits on the upper side of the supporting panel 12.

The driving voltage of the light emitting member 42 is from a battery disposed on the keyboard shell 11 or from the main body of a computer.

The main board (not shown) is electrically connected to the computer via electric codes.

The process of assembling the keyboard with above described structure is described as follows.

First of all, the keycap supports 30 are arranged on the supporting panel 12. Then the keycaps 13 are arranged on the keycap supports 30.

At the last, the supporting panel 12, the FPC sheet 14, and the light emitting substrate 41 are fixed on the supporting platform 20 and the fixing frame 11b of the keyboard shell 11 via the screw holes 12c, 14c, 11c, and 21a.

As the described embodiment of the invention, the elastomers 51 are arranged on the FPC sheet 14, the supporting panel 12, the FPC sheet 14 and the light emitting substrate 41 are assembled in the keyboard shell 11 via the fixing groove 11a. The assembly is not higher than the bottom of the keyboard shell 11. This decreases the thickness of the keyboard.

The fixing groove 11a has fixing frame 11b which reaches the top of the supporting panel 12. The supporting panel 12, the FPC sheet 14, and the light emitting substrate 41 are assembled in the keyboard shell 11. This structure keeps the supporting panel 12, the FPC sheet 14, and the light emitting substrate 41 stable in the keyboard shell 11, and does not increase the thickness of the keyboard.

The keyboard includes a supporting platform 20 which reaches the upper side of the supporting panel 12. The supporting panel 12, the FPC sheet 14 and the light emitting substrate 41 are assembled in the keyboard shell 11. This structure keeps the supporting panel 12, the FPC sheet 14 and the light emitting substrate 41 stable in the keyboard shell 11, and does not increase the thickness of the keyboard.

It will be understood that the above particular embodiment is shown and described by way of illustration only. The principles and the features of the present disclosure may be employed in various and numerous embodiments thereof without departing from the scope of the disclosure as claimed. The above-described embodiment illustrates the scope of the disclosure but do not restrict the scope of the disclosure.

What is claimed is:

1. A keyboard comprising:
a keyboard shell;
a supporting panel arranged to the keyboard shell and having a plurality of elastomer holes therein;
a plurality of keycaps arranged on the corresponding elastomer holes;
a plurality of keycap supports between the supporting panel and the corresponding keycaps;
a plurality of elastomers through the corresponding elastomer holes and being exposed out of the supporting panel;
an FPC sheet under the supporting panel with a plurality of key signal pads corresponding to the plurality of elastomers, when pressure is provided on the keycap and corresponding elastomer, the corresponding key signal pads are in ON state, and when pressure is released from the keycap and corresponding elastomer, the key signal pads are in OFF state;
a light emitting substrate arranged under the FPC sheet, and a plurality of light emitting parts with light emitting members arranged on the light emitting substrate; the elastomer being arranged on the FPC sheet;
light through holes formed around the elastomer on the FPC sheet, the light emitting members being arranged on the light emitting substrate, and the light beams from the light emitting members being through the light through holes to the up side of the supporting panel.

2. The keyboard as claimed in claim 1, wherein a fixing groove which is used for fixing the supporting panel, the FPC sheet and the light emitting substrate formed on the keyboard shell, the fixing grooves extending from the bottom of the keyboard shell to the supporting panel, and the fixing groove comprises a fixing frame which reaches the top of the supporting panel;
the supporting panel, the FPC sheet, and the light emitting substrate are supported in the keyboard shell through the fixing groove.

3. The keyboard as claimed in claim 1, wherein the FPC sheet comprises a middle insulative layer, an upper layer and a lower layer arranged at the two sides of the insulative layer, respectively, and outer connecting pads electrically connecting the upper layer and the lower layer.

4. The keyboard as claimed in claim 1, wherein the keyboard further comprises a supporting platform, the supporting platform reaches the upper side of the supporting panel without interfering the elastomer and the keycap support, and extends from the keyboard shell;
the supporting panel, the FPC sheet, and the light emitting substrate are supported in the keyboard shell by the supporting platform.

5. The keyboard as claimed in claim 1, wherein the supporting panel comprises a plurality of screw holes thereon and four supporting protrusions around each of the elastomer holes.

6. A keyboard comprising:
a keyboard shell;
a supporting panel arranged to the keyboard shell and having a plurality of elastomer holes;
a plurality of keycaps on the corresponding elastomer holes;
a plurality of keycap supports between the supporting panel and the corresponding keycaps;
a plurality of elastomers through the corresponding elastomer holes and exposed out of the supporting panel;
an FPC sheet under the supporting panel with a plurality of key signal pads corresponding to the plurality of elastomers, when pressure is provided on the keycap and corresponding elastomer, the corresponding key signal pads are in ON state, and when pressure is released from the he keycap and corresponding elastomer, the key signal pads are in OFF state;
a light emitting substrate arranged under the FPC sheet, and a plurality of light emitting light emitting parts with light emitting members arranged on the light emitting substrate;
a fixing groove which is used for fixing the supporting panel, the FPC sheet and the light emitting substrate formed on the keyboard shell, the fixing grooves extending from the bottom of the keyboard shell to the supporting panel;
the area of the elastomer hole being greater than that of the elastomer, and the space between the elastomer hole and the elastomer defining a light through hole area;
the elastomer being arranged on the FPC sheet;
the supporting panel, the FPC sheet, and the light emitting substrate being supported in the keyboard shell through the fixing groove;
light through holes formed around the elastomer on the FPC sheet, the light emitting members being arranged on the light emitting substrate, and the light beams from the light emitting members go through the light through holes to the up side of the supporting panel.

7. The keyboard as claimed in claim 6, wherein the fixing groove comprises a fixing frame which reaches the top of the supporting panel;
the supporting panel, the FPC sheet, and the light emitting substrate are supported in the keyboard shell.

8. The keyboard as claimed in claim 6, wherein the FPC sheet comprises a middle insulative layer, an upper layer and a lower layer arranged at the two sides of the insulative layer, respectively, and outer connecting pads electrically connecting the upper layer and the lower layer.

9. The keyboard as claimed in claim 6, wherein the keyboard further comprises a supporting platform, the supporting platform reaches the upper side of the supporting panel without interfering the elastomer and the keycap support, and extends from the keyboard shell;
the supporting panel, the FPC sheet, and the light emitting substrate are supported in the keyboard shell by the supporting platform.

10. The keyboard as claimed in claim 6, wherein the supporting panel comprises a plurality of screw holes thereon and four supporting protrusions around each of the elastomer holes.

* * * * *